(12) United States Patent
Rogers (10) Patent No.: US 9,123,230 B2
(45) Date of Patent: Sep. 1, 2015

(54) SEWER BACKUP ALARM

(71) Applicant: Frank T. Rogers, Loganville, GA (US)

(72) Inventor: Frank T. Rogers, Loganville, GA (US)

( * ) Notice: Subject to any disclaimer, the term of this patent is extended or adjusted under 35 U.S.C. 154(b) by 19 days.

(21) Appl. No.: 13/894,153

(22) Filed: Aug. 13, 2013

(65) Prior Publication Data

US 2013/0314235 A1   Nov. 28, 2013

Related U.S. Application Data

(60) Provisional application No. 61/649,801, filed on May 21, 2012.

(51) Int. Cl.
| | | |
|---|---|---|
| *G01W 1/00* | (2006.01) | |
| *G08B 21/18* | (2006.01) | |
| *E03F 7/00* | (2006.01) | |
| *G01F 23/62* | (2006.01) | |
| *G01F 23/00* | (2006.01) | |

(52) U.S. Cl.
CPC ............... *G08B 21/182* (2013.01); *E03F 7/00* (2013.01); *G01F 23/0007* (2013.01); *G01F 23/62* (2013.01); *E03F 2201/40* (2013.01)

(58) Field of Classification Search
CPC ....... G08B 21/182; E03F 2201/40; E03F 7/00
See application file for complete search history.

(56) References Cited

U.S. PATENT DOCUMENTS

| | | | |
|---|---|---|---|
| 3,644,916 A | 2/1972 | Payne | |
| 3,774,187 A | 11/1973 | Windham | |
| 3,935,741 A * | 2/1976 | Zinsmeyer et al. ............. | 73/313 |
| 4,091,365 A | 5/1978 | Allen | |
| 4,392,128 A | 7/1983 | Young et al. | |
| 4,398,186 A * | 8/1983 | Statz ............................... | 340/616 |
| 4,546,346 A | 10/1985 | Wave et al. | |
| 4,624,280 A | 11/1986 | DePirro | |
| 4,961,068 A * | 10/1990 | Hendricksen ................. | 340/616 |
| 4,973,950 A | 11/1990 | Tourtillott | |
| 5,091,863 A * | 2/1992 | Hungerford et al. .......... | 700/283 |
| 5,113,901 A | 5/1992 | Young | |
| 5,144,975 A * | 9/1992 | Polis ............................. | 137/392 |
| 5,172,332 A * | 12/1992 | Hungerford et al. .......... | 700/267 |
| 5,436,615 A | 7/1995 | Williams | |
| 5,687,761 A | 11/1997 | Langes | |
| 5,699,049 A * | 12/1997 | Difiore ......................... | 340/618 |
| 5,942,698 A | 8/1999 | Stevens | |
| 6,040,776 A | 3/2000 | Glover | |
| 6,217,752 B1 * | 4/2001 | Coots ............................. | 210/86 |
| 6,442,955 B1 | 9/2002 | Oakner | |
| 6,557,412 B1 * | 5/2003 | Barbier et al. ................. | 73/313 |
| 7,057,507 B1 | 6/2006 | Sandifer | |
| 7,191,649 B1 | 3/2007 | Coogle | |
| 7,221,282 B1 | 5/2007 | Ross et al. | |
| 7,336,190 B2 | 2/2008 | Giordano, Jr. et al. | |
| 7,417,552 B1 | 8/2008 | Vaskovic | |
| 7,821,411 B1 | 10/2010 | Ward | |
| 7,907,059 B1 | 3/2011 | Guy | |

(Continued)

*Primary Examiner* — Ojiako Nwugo (57) ABSTRACT

This system will alert an occupant of a backup in the sewer or septic system and could be used in a residential or commercial structure. The system is affixed to a sewer waste line and includes a float device and a wireless alert device. When a backup occurs, the float will lift and break the magnetic connection between a magnet connected to the float and a sensor on the wireless alert device. This, in turn, will cause a chime or other alarm device to activate inside the structure, alerting the occupant of a backup. The alarm will enable the occupant to turn off or not use any items which use running water until the problem is resolved.

1 Claim, 8 Drawing Sheets

(56) References Cited

U.S. PATENT DOCUMENTS

| | | |
|---|---|---|
| 8,059,004 B2 | 11/2011 | James et al. |
| 8,066,029 B2 | 11/2011 | McDonald et al. |
| 2003/0048191 A1 | 3/2003 | Denton |
| 2003/0051655 A1 | 3/2003 | Broyles |
| 2003/0145371 A1 | 8/2003 | Ghertner |
| 2004/0221646 A1* | 11/2004 | Ohhashi et al. ............... 73/313 |
| 2005/0062611 A1 | 3/2005 | Johnson |
| 2005/0099311 A1 | 5/2005 | Eskins |
| 2005/0281679 A1 | 12/2005 | Niedermeyer |
| 2006/0033629 A1 | 2/2006 | Froeter et al. |
| 2007/0063856 A1 | 3/2007 | Gibson |
| 2007/0205906 A1* | 9/2007 | Giordano et al. ............. 340/608 |
| 2009/0278699 A1* | 11/2009 | Horst ........................... 340/603 |
| 2009/0303043 A1* | 12/2009 | Albahri ...................... 340/568.1 |
| 2009/0314351 A1* | 12/2009 | McDonald et al. ............... 137/2 |
| 2010/0052921 A1 | 3/2010 | Cantolino |
| 2010/0065131 A1 | 3/2010 | Grooms |

* cited by examiner

FIG. 7A  FIG. 7B 1. 4" PVC Grip Tip cap
2. 2-3/8" section of 4" PVC pipe
3. 4" PVC male adaptor
4. Wireless Transmitter
5. Magnet from wireless entry alert set
6. Plastic adaptor
7. 4" plastic test cap
8. 4" PVC female adaptor
9. 4" PVC pipe
10. 4" x 4" x 4" PVC Sanitary Tee
11. 1/4" x 20 threaded rod (length can vary)
12. 3-13/16" Float Ball with 1/4" threaded tip
13. 1/4" x 20 threaded coupling (if needed to extend length of threaded rod)
14. Transmitter
15. Magnet
16. Alert Chime (connected to electrical outlet inside structure; within 150ft of transmitter)
17. 6-volt alkaline battery (in #14 transmitter)
18. 6x32x3/4" bolt
19. 6x32x3" bolt
20. 6x32 self-locking nut
21. 1/4x20 nut

FIG. 8

SEWER BACKUP ALARM

BACKGROUND

The following disclosure relates generally to the field of waste water alarm systems.

Significant damage is caused yearly to residences or business structures due to a sewer waste line or septic system becoming clogged or blocked, not allowing the waste water to flow freely into the sewer or septic system, and thereby backing up waste water into the structure. Although most systems have a clean-out plug installed in the main waste line which enables access to the line, this does not prevent a backup and the potential for damage if waste water enters the structure. This would indicate the need for a device/system which would alert an occupant of such a backup and thereby avoid costly damage.

SUMMARY

A device is described that will alert the occupant of a residential or business structure when the sewer line or septic system becomes clogged or backs up. The device can be installed into a line which has an existing cleanout or modified to connect to a waste line which does not have an existing cleanout. The device incorporates the use of a wireless transmitter which eliminates the need for any kind of electrical wiring. The wireless transmitter for the alert device may be powered by a 6-volt alkaline battery.

According to particular embodiments, a system for detecting impaired flow of a fluid through a main pipe includes (1) an overflow sensor assembly that includes a float positioned within a substantially vertical pipe that is in fluid communication with the main pipe, and a magnet connected to the float and mounted to an adaptor plate, the adaptor plate defining at least two guide pins positioned to slidably engage through corresponding holes defined by an intermediate cap positioned within the vertical pipe; (2) a wireless transmitter connected to the intermediate cap and comprising a sensor, wherein the at least two guide pins and the corresponding holes in the intermediate cap facilitate alignment of the magnet with the sensor, and wherein the wireless transmitter is configured to broadcast a signal when the magnet is not substantially aligned with the sensor; and (3) an alarm in communication with the wireless transmitter and configured to receive the signal and in response emit an alarm sound.

BRIEF DESCRIPTION OF DRAWINGS

Reference will now be made to the accompanying drawings, which are not necessarily drawn to scale, and wherein:

FIG. 7-A is a side-view illustration of a wireless transmitter attached to a plastic intermediate test cap, along with a magnet, a threaded rod, and a float attached to a plastic adaptor plate, according to various embodiments.

FIG. 7-B is a side-view illustration showing only a magnet, a threaded rod, and a float attached to a plastic adaptor plate, according to various embodiments.

DETAILED DESCRIPTION

The present systems and apparatuses and methods are understood more readily by reference to the following detailed description, examples, drawing, and claims, and their previous and following descriptions. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching in its best, currently known embodiment. To this end, those skilled in the relevant art will recognize and appreciate that many changes can be made to the various aspects described herein, while still obtaining the beneficial results of the technology disclosed. It will also be apparent that some of the desired benefits can be obtained by selecting some of the features while not utilizing others. Accordingly, those with ordinary skill in the art will recognize that many modifications and adaptations are possible, and may even be desirable in certain circumstances, and are a part of the invention described. Thus, the following description is provided as illustrative of the principles of the invention and not in limitation thereof.

As used throughout, the singular forms "a," "an" and "the" include plural referents unless the context clearly dictates otherwise. Thus, for example, reference to "a" component can include two or more such components unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Also, as used herein, the terms "optional" or "optionally" mean that the subsequently described event or circumstance may or may not occur, and that the description includes instances where said event or circumstance occurs and instances where it does not.

As used herein, the term "facilitate" means to make easier or less difficult and the terms "inhibit" and "impede" mean to interfere with, hinder, or delay the progress. Also, the words "proximal" and "distal" are used to describe items or portions of items that are situated closer to and away from, respectively, a user or operator. Thus, for example, the near end or other portion of an item may be referred to as the proximal end, whereas the generally opposing portion or far end may be referred to as the distal end.

Backup Alarm System

Although the various embodiments are described with reference to a waste water or sewer line, the assemblies, system, and methods may be used to detect or monitor the flow of any fluid through a conduit or other structure.

Figure 1:
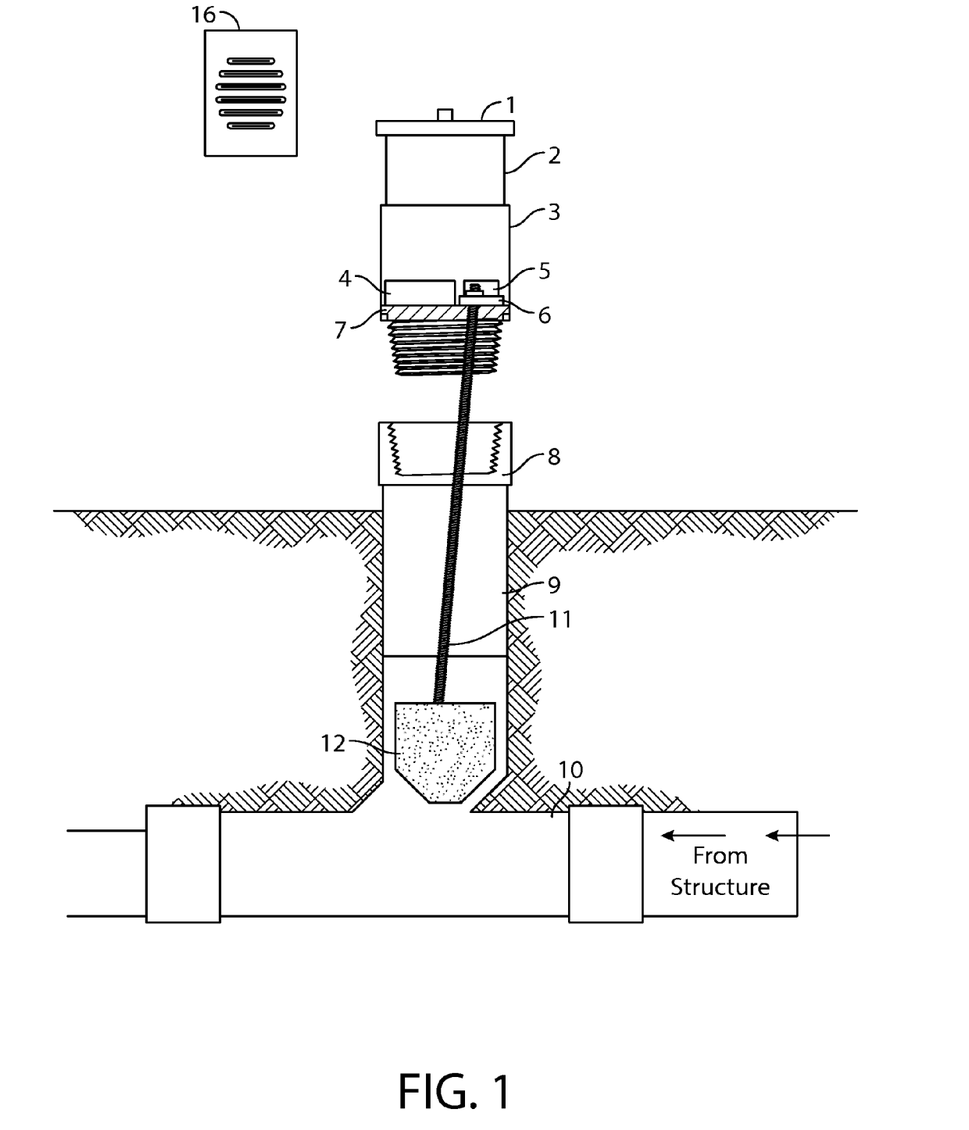
FIG. 1 is a side-view illustration of the device, according to various embodiments, where there is an existing cleanout plug on the outside of the structure.
Figure 7A:
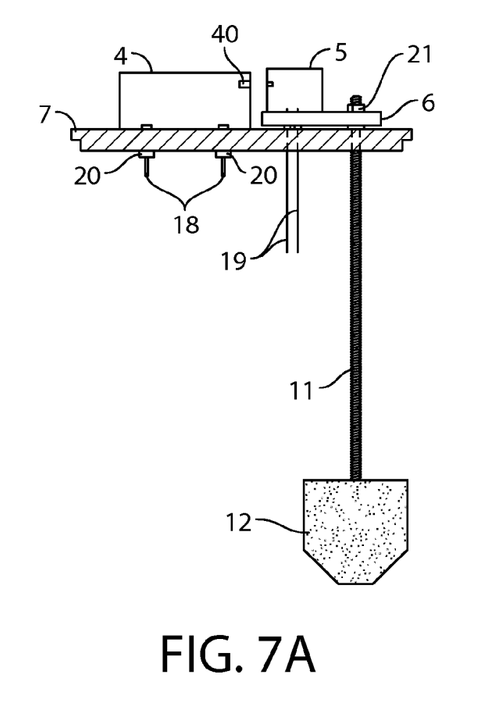

FIG. 1 is an illustration of a system for detecting impaired flow of a fluid through a pipe, according to particular embodiments. As shown, the system includes a plastic intermediate test cap 7 that is positioned within a substantially vertical pipe 2 and that supports a wireless transmitter 4. The test cap 7 is referred to as intermediate in order to distinguish it from the top cap 1 which may be used on top of the assembly. The vertical pipe 2 may be a PVC pipe that is four inches in diameter. The wireless transmitter 4 may be connected to the intermediate test cap 7 by two bolts 18 secured in place with self-locking nuts 20 (as illustrated in FIG. 7-A).

Figure 5:
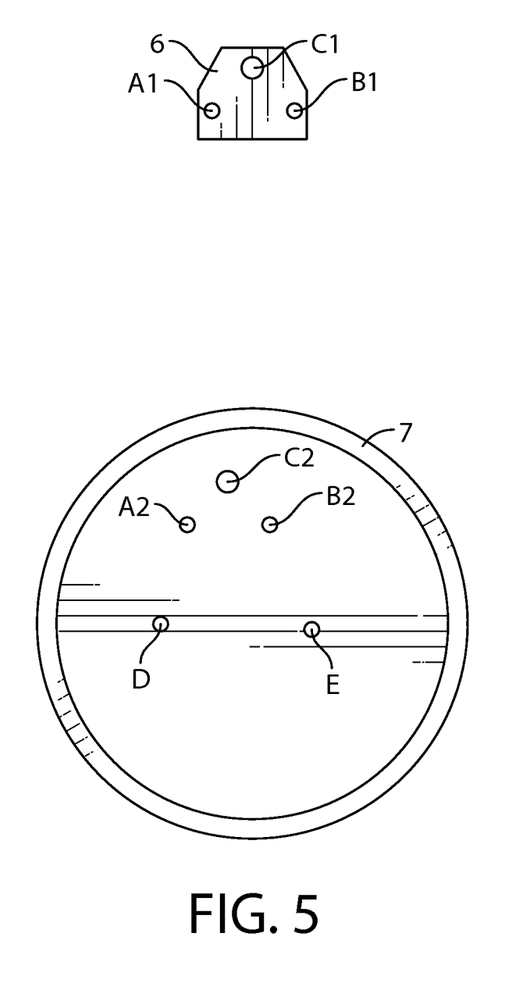
FIG. 5 is an illustration of a plastic adaptor plate and a plastic intermediate test cap with pre-drilled holes, according to various embodiments, prior to assembly.
Figure 6:
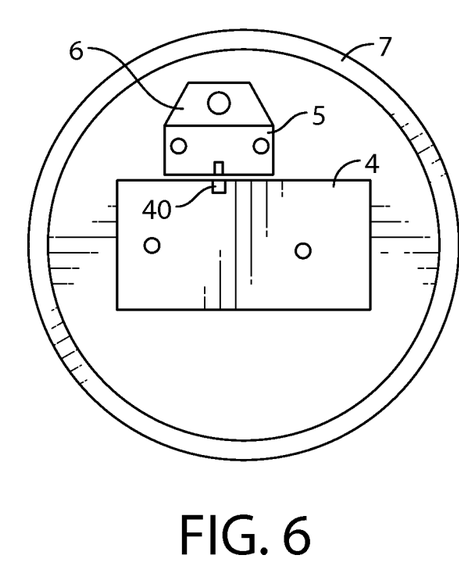
FIG. 6 is a top-view illustration of a magnet attached to a plastic adaptor plate, and a wireless transmitter attached to a plastic intermediate test cap, according to various embodiments.
Figure 7B:
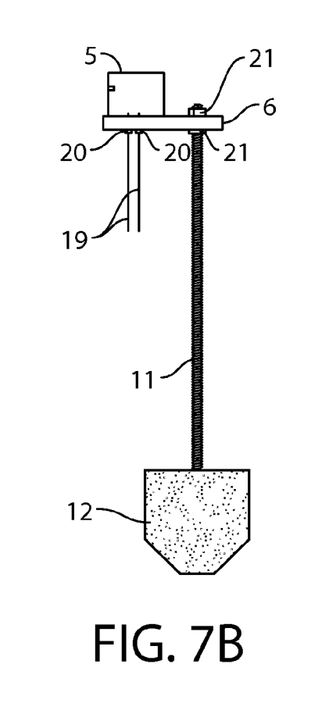
Figure 8:
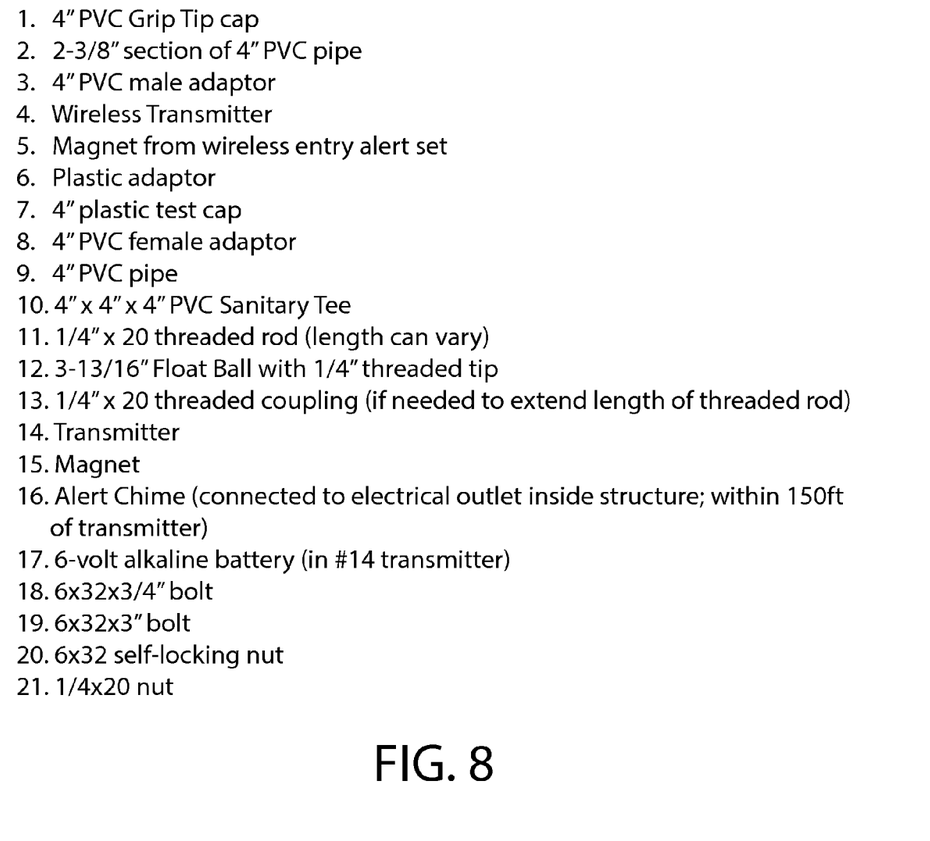
FIG. 8 is an itemized list of parts used which may be used in the construction of this device, according to various embodiments.

The magnet 5 may be mounted to a plastic adaptor plate 6. As shown in FIG. 5, the adaptor plate 6 may include two bolts 19 that are positioned, according to particular embodiments, in holes A1 and B1 on FIG. 5. The two bolts 19 may be three inches long and may be secured in placed by two self-locking nuts (20, as shown in FIGS. 7-A and 7-B) on the bottom side of the plastic adaptor plate 6. The two bolts 19 may be positioned on the adaptor plate 6 so that the two bolts 19 slide through two corresponding holes A2, B2 in the intermediate test cap 7, as shown in FIG. 5, FIG. 7-A, and FIG. 7-B. In this aspect, the two bolts 19 are slidably engaged with the two corresponding holes A1, B2. The two bolts 19 prevent the magnet 5 from shifting, relative to the wireless transmitter 4 which is mounted on the intermediate test cap 7, as shown in FIGS. 7-A and 7-B, when the float 12 (which may be mounted on a threaded rod 11) rises upward through a substantially vertical pipe 9 during a backup. In this aspect, the two bolts 19 act as guide pins that facilitate the alignment of the magnet 5 and the wireless transmitter 4. More specifically, as illustrated in FIG. 6 and in FIG. 7-A, the wireless transmitter 4 may include a sensor 40. As understood by those of skill in the art, the wireless transmitter 4 is configured to broadcast a signal if and when its sensor 40 is not substantially aligned with the magnet 5. The horizontal alignment of the sensor 40 and the magnet 5 is shown in FIG. 6. The vertical alignment of the sensor 40 and the magnet 5 is shown in FIG. 7-A.

Referring again to FIG. 5, a threaded rod 11 may be attached to the plastic adaptor plate 6 through hole C1 (FIGS. 5 and 6) and secured to the adaptor plate 6 with ¼" nuts (21, as shown in FIG. 7-B) on both sides of adaptor plate 6. As shown in FIG. 5, the threaded rod 11 may be positioned on the adaptor plate 6 so that the threaded rod slides through a corresponding rod hole C2 in the intermediate test cap 7. The float 12 may be attached to the end of the threaded rod 11. The threaded rod 11 may be one-quarter inch in diameter and can be cut to appropriate length if needed or made longer using a ¼" threaded coupling 13 and additional length of threaded rod, as shown in FIG. 2.

For a main pipe from a structure that includes an existing cleanout, as illustrated in FIG. 1, the plug can be removed and the male adaptor 3 installed into the existing female adaptor 8. The test cap assembly, including the intermediate test cap 7 and adaptor plate 6 as described above, may be placed down into the male adaptor 3 and seated in place. A length of pipe 2 may be inserted into the male adaptor 3 and secured against the intermediate test cap 7. The pipe 2 may be PVC, four inches in diameter, and approximately 2⅜ inches in length, according to particular embodiments. Optionally, a small bead of silicon should be run around the top edge of the male adaptor 3 to waterproof. A cap 1, such as a four-inch PVC Grip Tip cap, may be placed on top to protect the transmitter 4 and magnet 5.

Figure 2:
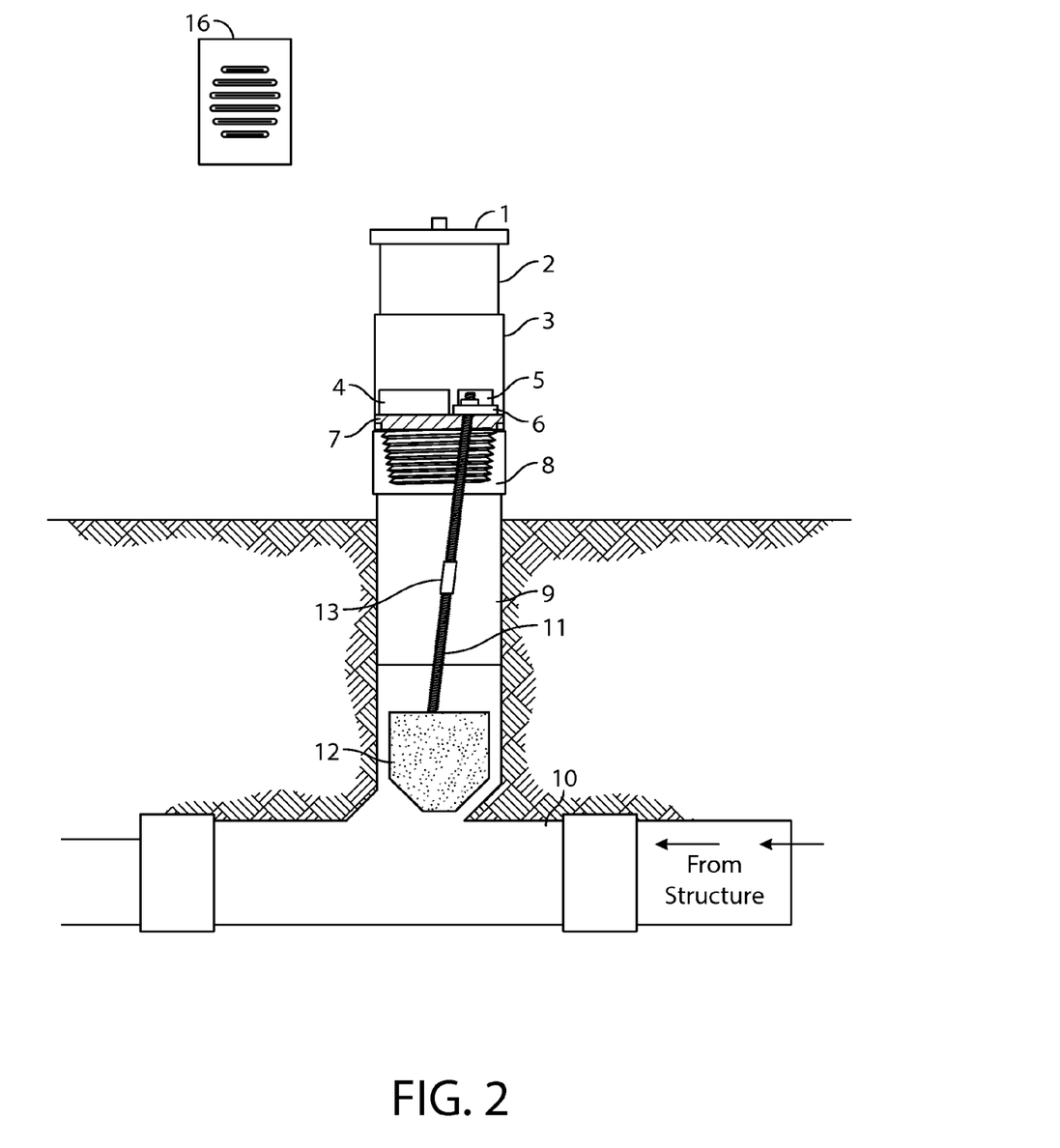
FIG. 2 is a side-view illustration of the device, according to various embodiments, where there is no existing cleanout plug on the outside of the structure.
Figure 3:
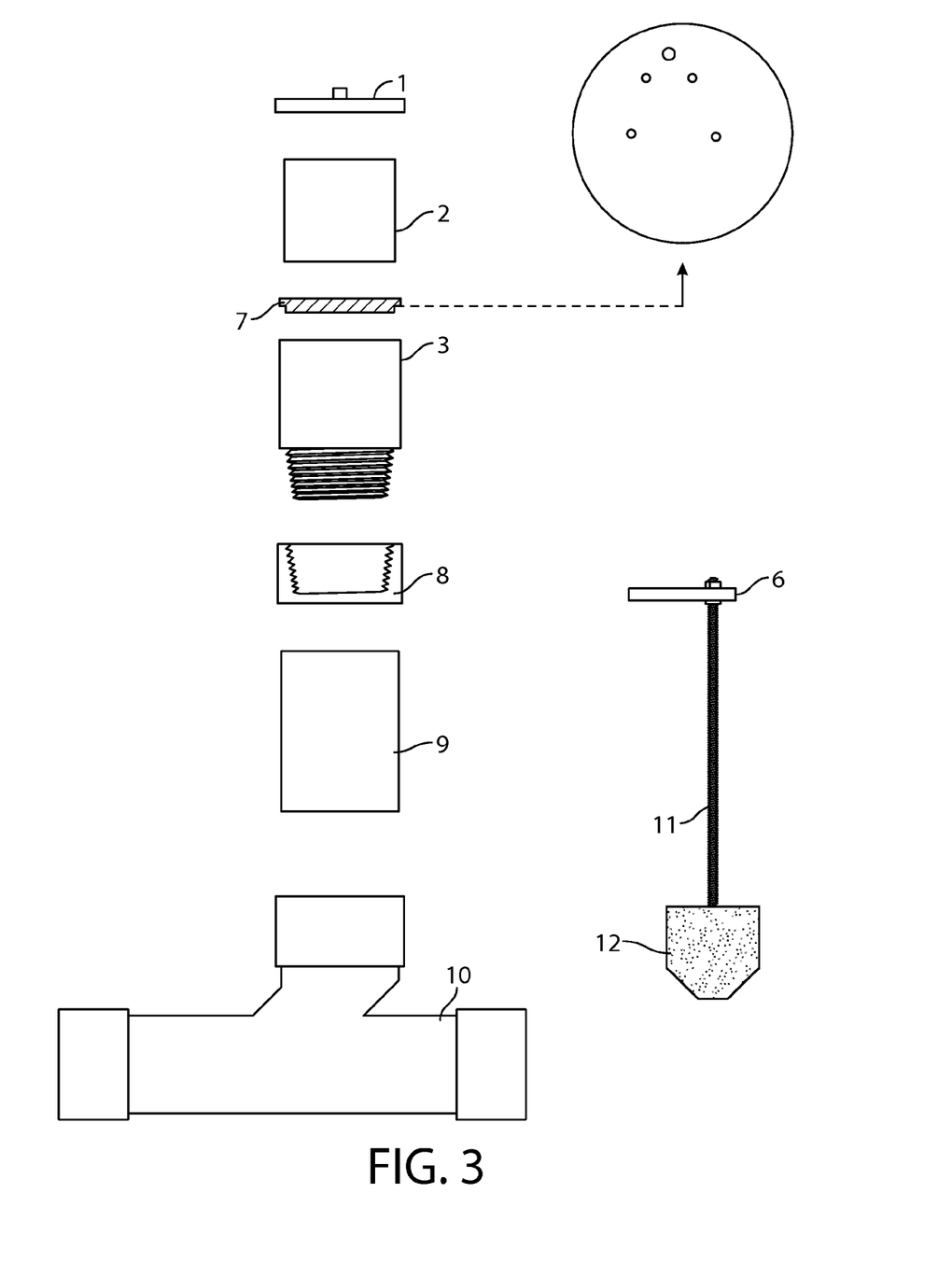
FIG. 3 is a separated and numbered view of parts which make up the device, according to various embodiments, as illustrated in both FIG. 1 and FIG. 2.
Figure 4:
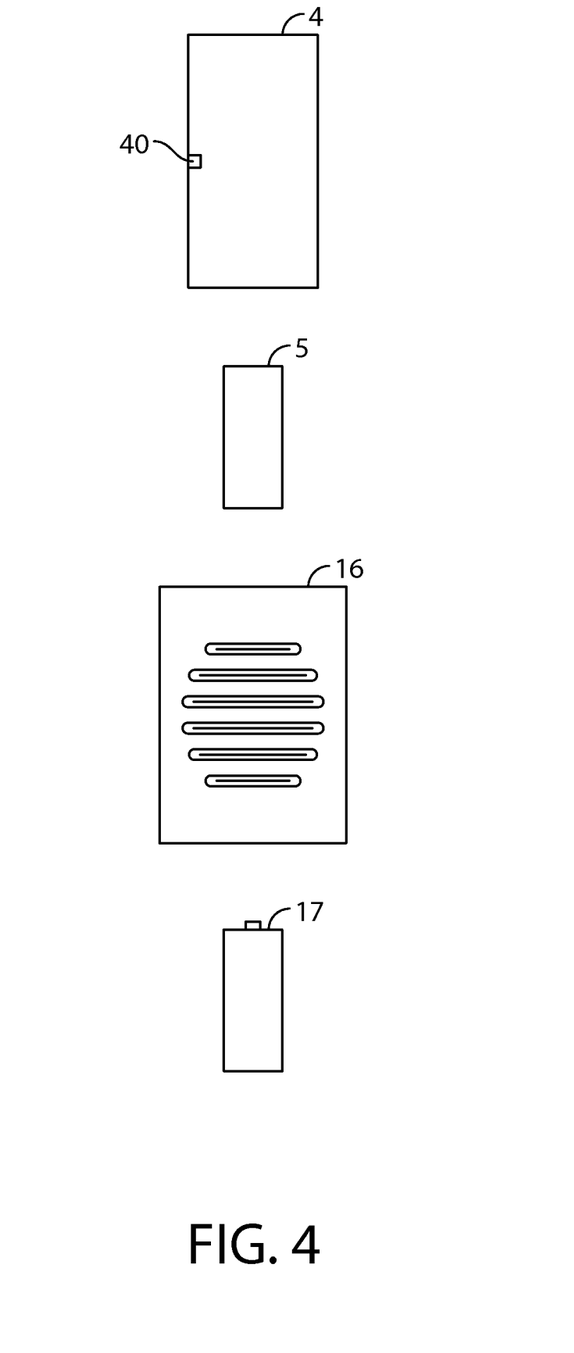
FIG. 4 is a view of the items which comprise the wireless transmitter and alert device, according to various embodiments.

For a main pipe from a structure that does not include an existing cleanout (which should be rare), as illustrated in FIG. 2, the sewer line will have to be exposed. The sewer line can be cut to place a tee 10, such as a 4"×4"×4" PVC Sanitary Tee, and a length of pipe 9, such as 4" PVC pipe, may be attached to the top opening on the tee 10, such that the pipe 9 is long enough to reach ground level. A female adaptor 8, such as a 4" PVC female adaptor, may be attached and glued to the top of the length of pipe 9. As shown in FIGS. 1 and 2, the substantially vertical pipe 9 is in fluid communication with the main line from the structure. The installation of the test cap assembly, including the intermediate test cap 7 and adaptor plate 6, as described above may then be completed.

In operation, the system alerts the occupant of a structure of a backup in the sewer waste line or septic system line when the float 12 is pushed up by rising water in the line. According to particular embodiments, when the float 12 rises about one inch or more, the magnetic connection between the sensor 40 on the wireless transmitter 4 and the magnet 5 mounted on the adaptor plate 6 is broken. This separation between the sensor 40 and the magnet 5 causes the wireless transmitter 4 to send a signal to a remote alarm 16, which should be placed no more than 150 feet from the wireless transmitter 4. The signal causes the remote alarm 16 to emit an alarm. The alarm sound will alert the occupant of a backup, at which time the occupant may turn off or not use any appliance or fixture which uses water (i.e., commode, dishwasher, washing machine) until the problem is resolved.

If the main sewer line needs to be accessed, the male adaptor 3 and the test cap assembly, including the intermediate test cap 7 and adaptor plate 6 described above, can be removed.

The invention claimed is:

1. A system for detecting impaired flow of a fluid through a main pipe, said system comprising: an overflow sensor assembly comprising a float positioned within a substantially vertical pipe in fluid communication with said main pipe, and a magnet connected to said float and mounted to an adaptor plate, said adaptor plate defining at least two guide pins positioned to slidably engage through corresponding holes defined by an intermediate cap positioned within said vertical pipe;

a wireless transmitter connected to said intermediate cap and comprising a sensor, wherein said at least two guide pins and said corresponding holes in said intermediate cap facilitate alignment of said magnet with said sensor, and wherein said wireless transmitter is configured to broadcast a signal when said magnet is not substantially aligned with said sensor; and an alarm in communication with said wireless transmitter and configured to receive said signal and in response emit an alarm sound; wherein said magnet is connected by a threaded rod to said float, and wherein said threaded rod is positioned to slidably engage through a corresponding rod hole defined by said intermediate cap, such that said threaded rod and said corresponding rod hole further facilitate alignment of said magnet with said sensor.

* * * * *